United States Patent
Thomas

(10) Patent No.: US 8,145,790 B2
(45) Date of Patent: *Mar. 27, 2012

(54) METHOD AND DEVICE FOR USING DYNAMIC UPDATES IN A NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2432 days.

This patent is subject to a terminal disclaimer.

(21) Appl. No.: 10/192,631

(22) Filed: Jul. 11, 2002

(65) Prior Publication Data

US 2004/0010619 A1 Jan. 15, 2004

(51) Int. Cl.
*G06F 15/16* (2006.01)
*G06F 15/173* (2006.01)

(52) U.S. Cl. ........................ 709/245; 709/242

(58) Field of Classification Search .................. 709/245, 709/242, 238; 370/401, 409
See application file for complete search history.

(56) References Cited

U.S. PATENT DOCUMENTS

| | | | | |
|---|---|---|---|---|
| 5,636,216 A * | 6/1997 | Fox et al. | ....................... | 370/402 |
| 5,999,536 A * | 12/1999 | Kawafuji et al. | ............. | 370/401 |
| 6,154,839 A * | 11/2000 | Arrow et al. | .................... | 713/154 |
| 6,282,195 B1 * | 8/2001 | Miller et al. | .................... | 370/392 |
| 6,587,462 B2 * | 7/2003 | Mahalingaiah | ............... | 370/389 |
| 6,591,306 B1 * | 7/2003 | Redlich | ......................... | 709/245 |
| 6,603,763 B1 * | 8/2003 | Koshino | ........................ | 370/389 |
| 6,747,979 B1 * | 6/2004 | Banks et al. | .................. | 370/401 |
| 6,895,443 B2 * | 5/2005 | Aiken | ........................... | 709/245 |
| 2002/0138628 A1 * | 9/2002 | Tingley et al. | ............... | 709/227 |
| 2003/0065812 A1 * | 4/2003 | Beier et al. | ..................... | 709/236 |

* cited by examiner

*Primary Examiner* — Brian J Gillis

(57) ABSTRACT

A computer network system for interconnecting nodes using dynamic updates includes a first network device configured to receive an information packet including a destination address for a source node. The first network device includes a first translation table for use in translating the destination address into an address indicator to replace the destination address in the information packet. The computer network system includes a second network device configured to receive the information packet, and to include a second translation table for use in translating the address indicator into the destination address. At least one of the first and second network devices are adapted to dynamically update at least one of first and second translation tables using updated information transferred using the computer network system.

32 Claims, 7 Drawing Sheets

ARP PACKET FORMAT

ARP REQUEST PACKET (FROM FIRST NETWORK DEVICE TO SECOND NETWORK DEVICE)

ARP REPLY PACKET (FROM SECOND NETWORK DEVICE TO FIRST NETWORK DEVICE)

METHOD AND DEVICE FOR USING DYNAMIC UPDATES IN A NETWORK

BACKGROUND OF THE INVENTION

1. Field of Invention

The present invention relates generally to network devices and to computer network systems which comprise network devices.

2. Background Information

Computer network systems, such as Local Area Networks (LANs), use network devices to interconnect nodes. Many computer network systems are implemented using Ethernet to provide a relatively high bandwidth interconnection of many nodes.

The nodes of a computer network system communicate using an established communication protocol to achieve point to point communication. Often, these protocols also include a multicast mechanism to send a data packet to multiple end nodes, and include a broadcast mechanism to send a data packet to all end nodes. This broadcast mechanism can limit the scaleability of a computer network system.

In addition to a broadcast mechanism, other techniques exist for directing a data packet to an end node. The virtual LAN (VLAN) standard allows for grouping nodes into Logical LAN groupings on a single fabric. In a VLAN environment, packets are assigned to a particular logical LAN and the packet is constrained to stay within that logical LAN. This ensures that unicast packets cannot be received outside of a particular grouping. Broadcast and multicast packets from a given node with a virtual LAN are similarly constrained to remain within the virtual LAN. The traffic containment that VLAN's provide, along with the controlled distribution of multicast packets, can permit a greater number of end nodes to be supported on a fabric. The IEEE VLAN standard has limited the length of a VLAN tag used to define the number of possible VLAN's within a computer network system to 12 bits.

SUMMARY OF THE INVENTION

Exemplary embodiments of the present invention are directed to a computer network system for interconnecting nodes using dynamic updates. The computer network system includes a first network device configured to receive an information packet including a destination address from a source node. The first network device includes a first translation table for use in translating the destination address into an address indicator which is used in the computer network system to replace the destination address in the information packet and to denote a destination node specified by the destination address. The computer network system also includes a second network device configured to receive the information packet including the address indicator. The second network device includes a second translation table for use in translating the address indicator into the destination address. The second network device is configured to send the information packet including the destination address to the destination node denoted by the address indicator. At least one of the first and second network devices is adapted to dynamically update at least one of the first and second translation tables using update information transferred using the computer network system.

Exemplary embodiments of the present invention are also directed to a network device using dynamic updates. The network device comprises first and second ports. The network device is configured to receive an information packet including a destination address across the first port. The network device comprises a translation unit including a translation table for use in translating the destination address into an address indicator which is used to replace the destination address in the information packet and to denote a destination node specified by the destination address. The network device is configured to transfer the information packet including the address indicator across the second port. The network device is adapted to dynamically update the translation table using update information received over at least one of the first or second ports.

The present invention is also directed to a method for controlling communication in a computer network system using dynamic updates. An exemplary method comprises dynamically updating a translation table in a network device of the computer network system using update information; receiving an information packet with a destination address at the network device; using the translation table, translating the destination address into an address indicator which is used to replace the destination address in the information packet and to denote a destination node specified by the destination address; and sending the information packet with the address indicator from the network device.

DETAILED DESCRIPTION OF THE PREFERRED EMBODIMENTS

Figure 1:
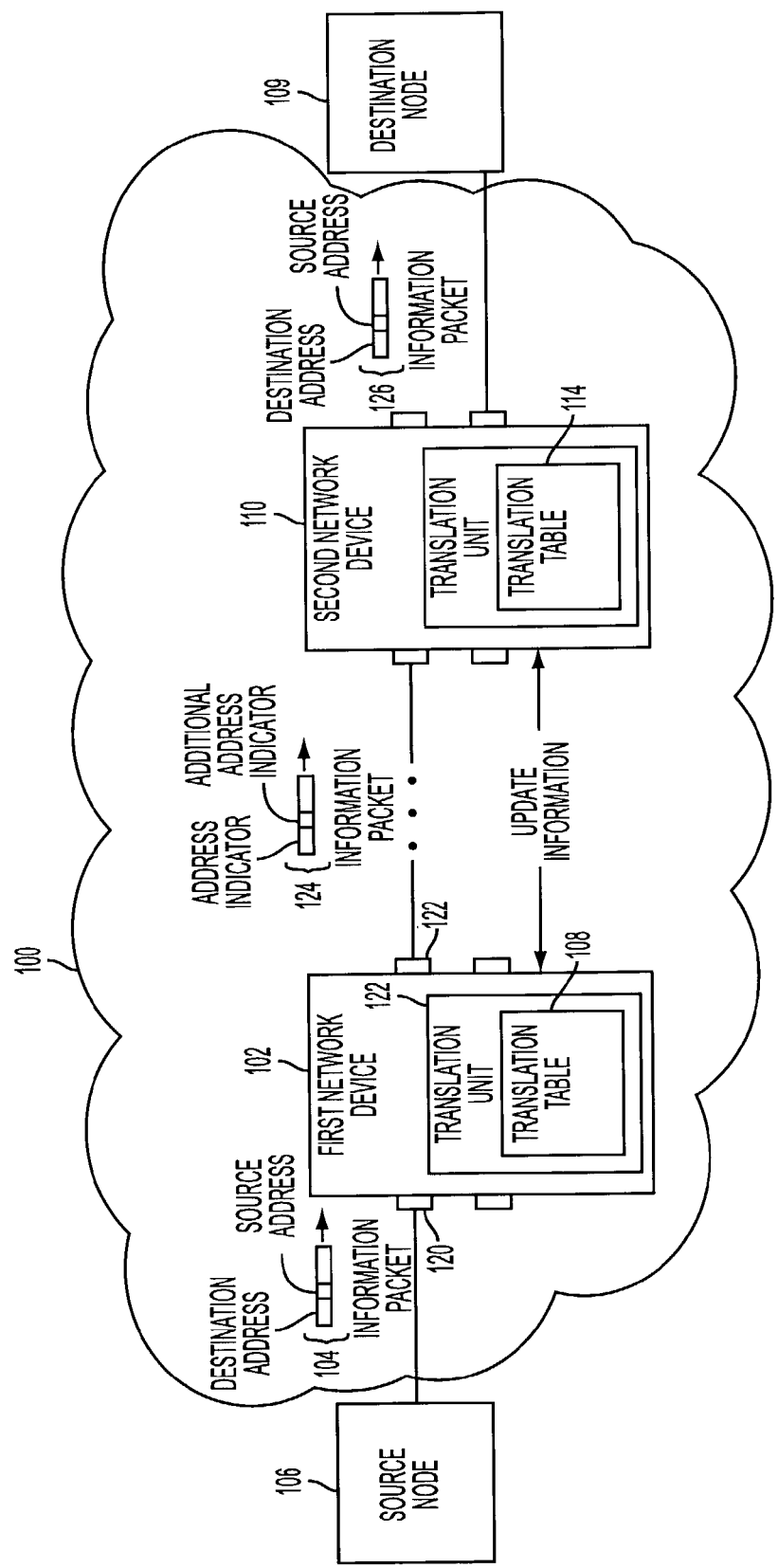
FIG. 1 is a diagram of an exemplary embodiment of the present invention.

In a exemplary embodiment of the present invention, a computer network system, such as the computer network system 100 of FIG. 1 is provided for interconnecting nodes using dynamic updates. The FIG. 1 computer network system comprises a first network device configured to receive an information packet including a destination address from a source node. In the FIG. 1 example, the first network device 102 is a modified switch, a modified bridge, or the like.

In an exemplary embodiment, the first network device includes a first translation table, such as translation table 108 of FIG. 1, for use in translating the destination address into an address indicator which is used in the computer network system to replace the destination address in the information packet and to denote a destination node, such as destination node 109, specified by the destination address. In one example, the translation table stores correspondences between the destination address and the address indicators.

The computer network system 100 comprises a second network device, such as second network device 110 of FIG. 1, configured to receive the information packet including the address indicator. The second network device includes a second translation table, such as translation table 114, for use in translating the address indicator into the destination address. The second network device is configured to send the information packet including the destination address to the destination node denoted by the address indicator. At least one of the first and second network devices is adapted to dynamically update at least one of the first and second translation tables using update information transferred using the computer network system.

In one example, a correspondence between a destination address and an address indicator is the update information that is transferred between translation tables.

The words "destination" and "source" in the terms "destination node" and "source node" refer to the nodes without limiting the function of the nodes. For example, the source node can be a node which also receives information packets, and the destination node can be a node which also sends information packets. The destination address is an address associated with the destination node, and the source address is an address associated with the source node. In one example, information packets enter the computer network from the source node directed to the destination node. In this case, the "destination address" can be stored in a destination address field and the "source address" can be stored in a source address field. For an information packet entering the computer network from the destination node directed to the source node, the "source address" can be stored in a destination address field and the "destination address" can be stored in a source address field.

The destination address can be an Ethernet address of the destination node and the address indicator is a ticket which denotes the destination node.

In one example, the destination address is a broadcast address. The address indicator can be a group identifier that indicates a group of nodes including the destination node 109.

The tickets can be arranged to simplify the forwarding of information packets. For example, when the destination address is an Ethernet address, each Ethernet address is replaced by a ticket. The tickets can be arranged such that other network devices within the computer network system need only use a prefix for forwarding the information packets. The use of prefixes can reduce the size of the forwarding tables of the network devices.

In one example, the address indicator indicates a group identifier. The use of the group identifier can allow for a large number of logical LANs, as described in the patent application entitled "Method And Device For Using An Address Indicator In A Network" of David Andrew Thomas, (Attorney Docket No. HP-10014760), filed on even date herewith, and incorporated herein by reference.

The first network device can be configured to determine whether the source node and destination node belong to a common group before forwarding the information packet. In the example of FIG. 1, the translation table 110 for a given address stores the corresponding address indicator and group identifier. If the group identifiers for the source address and destination address do not match, the network device does not forward the information packet.

The first network device can be configured to translate a source address into an additional address indicator that replaces the source address in the information packet.

In an exemplary embodiment, another network device is configured to use the additional address indicator to forward the information packet. The additional address indicator can be a ticket and a prefix of the ticket added into the forwarding table of the another network device.

The second network device can translate the additional address indicator into the source address that replaces the address indicator in the information packet.

In an exemplary embodiment, update information is obtained by modifying existing messages between the source and destination node. In the FIG. 2 example, existing messages between the source node 202 and destination node 204 can be modified to provide the update information.

In an exemplary embodiment, update information can be obtained by modifying address resolution protocol (ARP) packets transferred between the source and destination nodes.

Figure 2:
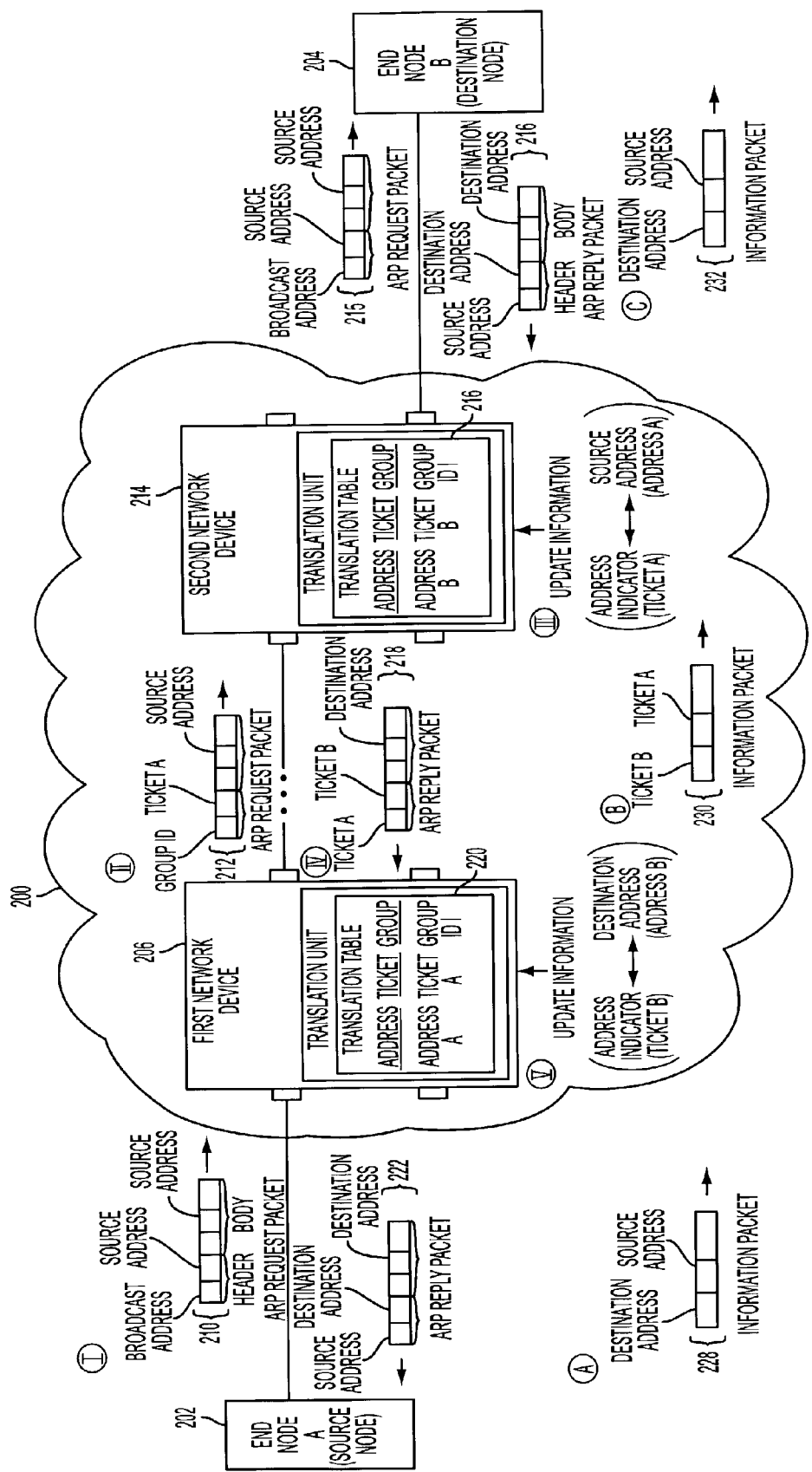
FIG. 2 is a diagram that illustrates a computer network system of an exemplary embodiment which uses modified address resolution protocol (ARP) packets to update information.

The first network device can be configured to modify an ARP request packet sent from the source node to the destination node. In the example of FIG. 2, an ARP request packet sent from the source node to the destination node is modified in the first network device 206. The first network device 206 modifies an ARP request packet 210 sent from the end node 202 to the first network device 206.

The ARP request packet can be modified by replacing the source address with an address indicator for the source indicator. The destination address can be replaced by a group identifier. In one example, the body of the ARP request packet is not modified; rather, only the ARP request packet header is modified.

In the FIG. 2 example, the information packet 212, modified by the first network device 206, is sent to the second network device 214. In FIG. 2, since the modified ARP request packet 212 contains both the address indicator for the source node 202 as well as the source address for the source node 202, the translation table 216 within the second network device 214 is updated with the correspondence between the address indicator and the source address. The second network device 214 forwards ARP request packet 215 to the destination node 204. The ARP request packet 215 can include the destination address and the source address. The destination node 204 can process the ARP request packet 215 according to the conventional ARP protocol.

In FIG. 2, the destination node 204 produces an ARP reply packet 216 which is sent from the destination node to the second network device 214. An ARP reply packet that is sent from the destination node to the source node is modified in the second network device. The ARP reply packet 216 is sent between the destination node 204 and the end node 202 and is modified in the second network device 214. The second network device 214 uses an address indicator for the destination node to replace the destination address in the header of the ARP reply packet. The source address is replaced by an address indicator for the source node.

In FIG. 2, the ARP reply packet contains an address indicator for the destination node inserted by the second network device and an address of the destination node. The first network device updates the first translation table with the correspondence between the address indicator for the destination node and the address of the destination node.

In FIG. 2, the ARP reply packet 218 contains an address indicator for the destination node which is inserted by the network device 214 in the ARP reply header. The address of the destination node is contained within the body of the ARP reply packet. The first network device 206 updates the first translation table with the correspondence between address indicator for the destination node 204 and the address of the destination node 204. In an exemplary embodiment, the first network device 206 replaces the source address and destination address in the header of the ARP reply packet 222 and sends the ARP reply packet 222 to the source node 202. The source node 202 uses the ARP reply packet 222 according to the conventional ARP protocol.

Since the translation table 220 now contains the correspondence between the destination address and the address indicator, when an information packet including the destination address 228 is received by the first network device 206, the translation table 220 allows for the translation of the destination address into the address indicator. The network device 206 produces an information packet 230. Once the information packet 230 is received by the second network device 214, the address indicator is translated into the destination address and the information packet 232 is provided to the destination node 204.

In an exemplary embodiment, the first network device is configured to examine the existing message between the source node and destination node and if information in the existing message is improper (for example, bogus), the first network device is configured to modify the existing message in a manner to indicate the message is bogus.

In the FIG. 2 example, when the existing message is an ARP request packet and the source address in the body does not match the source address in the header, the ARP request packet can be marked as bogus by not translating the source address in the header into a ticket. Since the bogus ARP request packet is not dropped, transparency of the computer network system is maintained. When the second network device receives an ARP request without a source ticket in the header, the second network device does not update its translation table. In one example, tickets use local Ethernet addresses so that the tickets can be distinguished by the network devices.

When the existing message is an ARP reply packet, the address information in the header can be compared to the address information in the body to make sure that the ARP reply packet is not bogus. If the address information does not match, the ARP reply packet can be marked as bogus by not translating an address.

Figure 3:
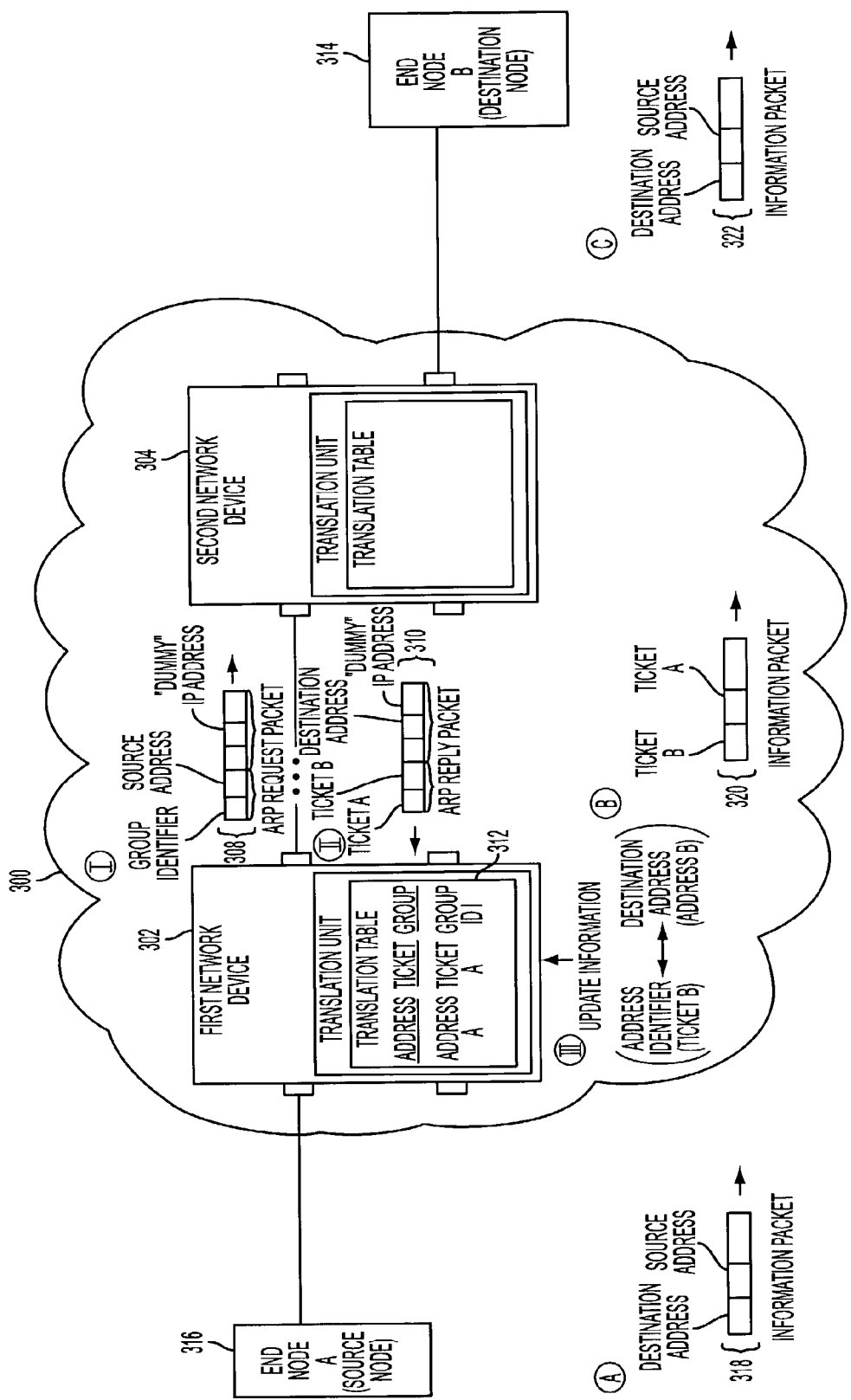
FIG. 3 is a diagram of an exemplary embodiment of the present invention which uses ARP packets to transfer update information.

In an exemplary embodiment, the update information is obtained by creating messages to send between the first and second network devices. In the example of FIG. 3, messages are transferred between the first network device 302 and the second network device 304. In an exemplary embodiment, the update information is obtained by creating ARP packets. In the example of FIG. 3, ARP packets are transferred between the first network device 302 and the second network device 304.

In an exemplary embodiment, the first network device is configured to create the ARP request packet and send the ARP request packet to the second network device. The ARP request packet can include a group identifier and the source address in the ARP request packet header.

The second network device can be configured to create an ARP reply packet and send the ARP reply packet to the network device. In the example of FIG. 3, the ARP reply packet 310 includes, within the ARP packet header, the address indicator for the source node and the address indicator for the destination node.

In one example, the network device uses the ARP reply packet to update the translation table. In the example of FIG. 3, the network device 302 updates the translation table 312 with the update information of the correspondence between the address indicator for the destination node 314 and the destination address.

In FIG. 3, since the first network device 302 and the second network device 304 create the ARP packets to update the translation tables, no messages are forwarded to the destination node 314 or the source node 316.

In the FIG. 3 example, the translation table 312 of the network device 302 has the update information with the correspondence between the address indicator for the destination node 314 and the destination address of the destination node 314. Information packets 318 from the source node 316 to the first network device 302 are modified by the first network device 302. The address indicator of the destination node 314 replaces the destination address to produce the information packet 320. The computer network forwards the information packet 320 based upon the address indicator. The second network device 304 translates the address indicator back into the destination address and forwards the packet 322 to the destination node 314.

Figure 4A:
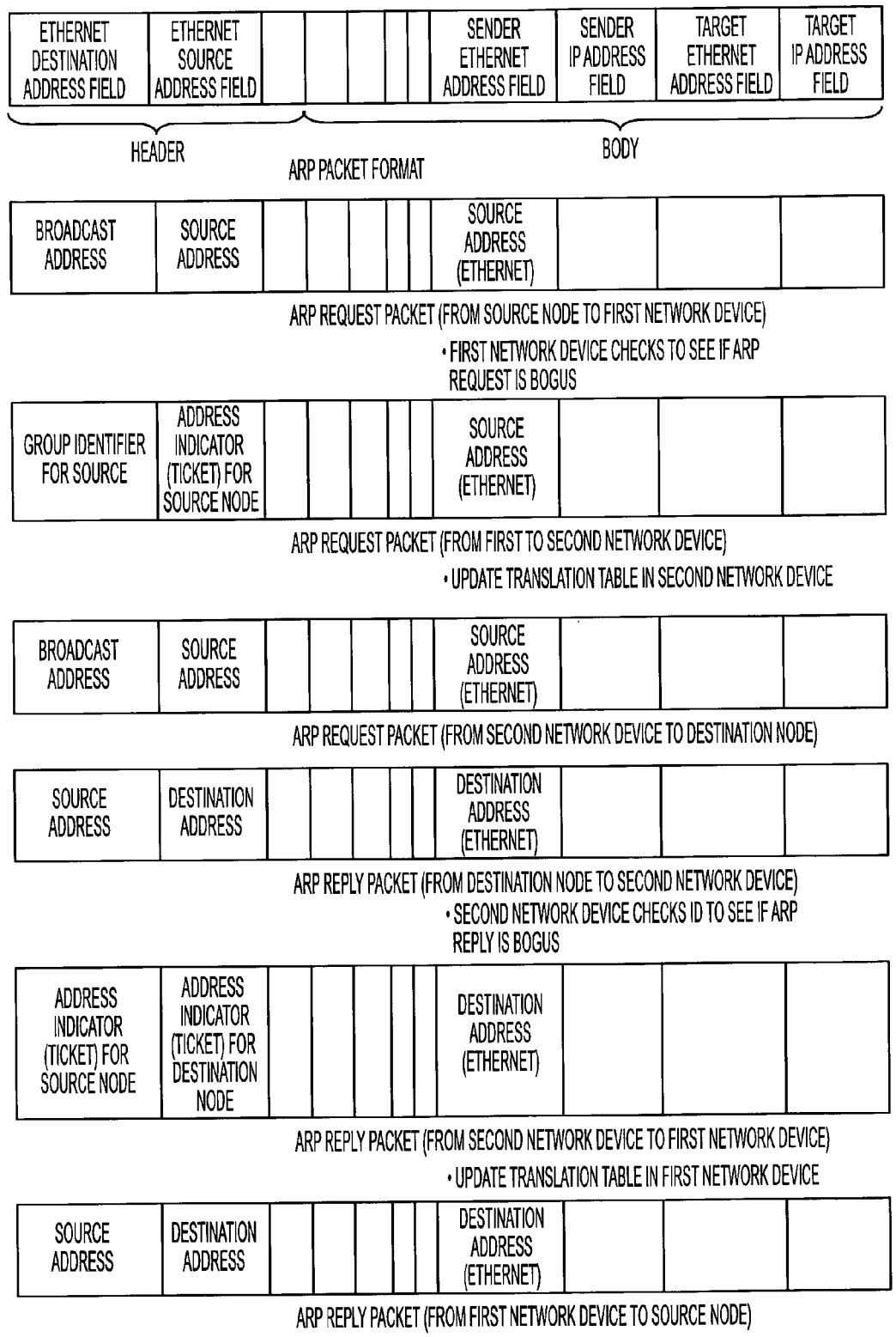
FIGS. 4A and 4B are diagrams that illustrate a modification of the ARP packets in an exemplary embodiment of the present invention.

FIG. 4A illustrates details of ARP packets according to an exemplary embodiment using ARP packet modifications. The header for the ARP packet format includes the Ethernet destination address field and Ethernet source address field. These fields are distinct from the terms "source address" and "destination address" used in the present invention.

Figure 4B:
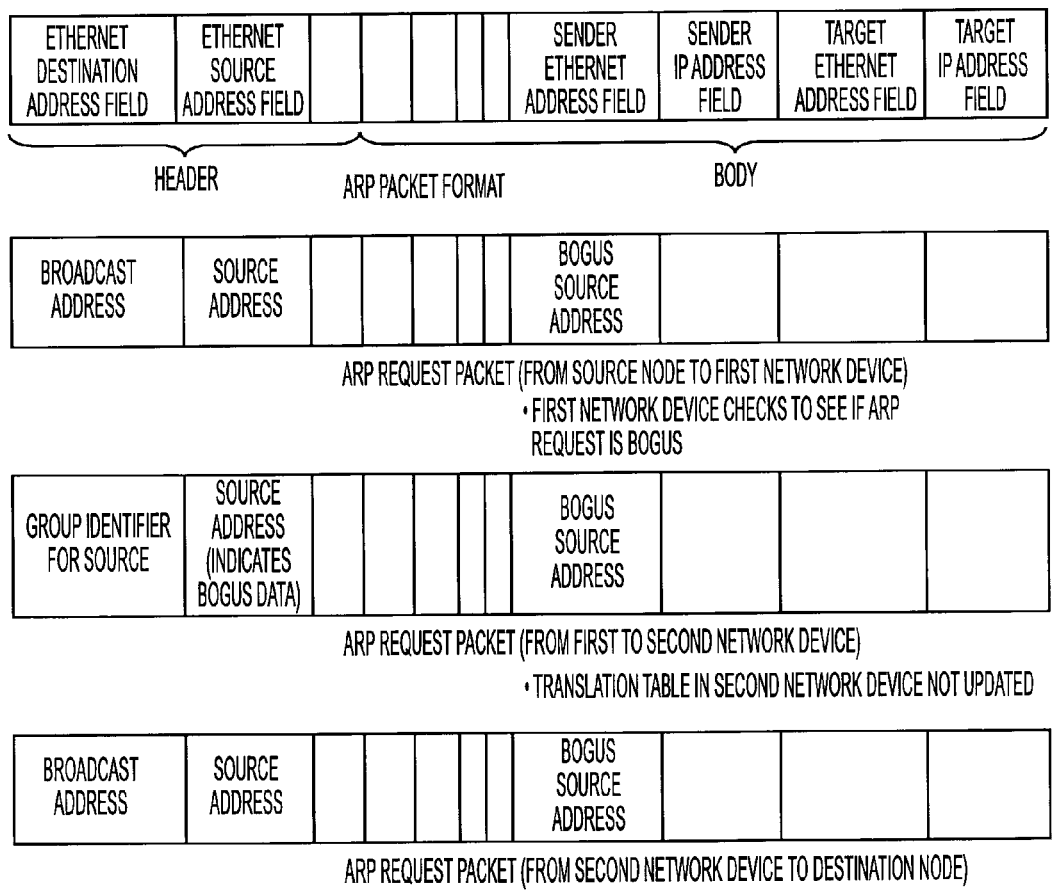

FIG. 4B illustrates details of the ARP packets according to an exemplary embodiment using ARP packet modifications when the source addresses in the header and the body of a ARP packet received by a network device do not match.

Figure 5:
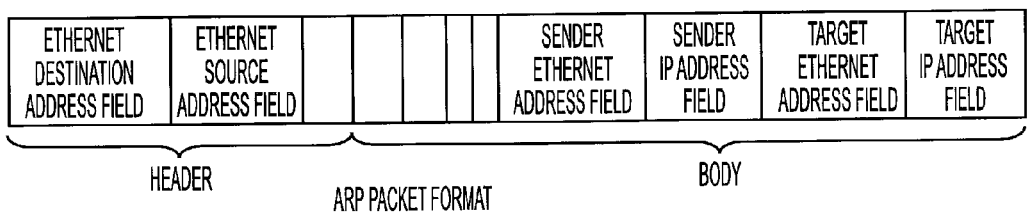
FIG. 5 is a diagram that illustrates the creation of ARP packets in an exemplary embodiment of the present invention.
Figure 5:
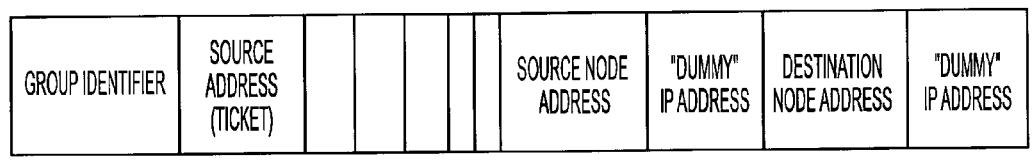
Figure 5:
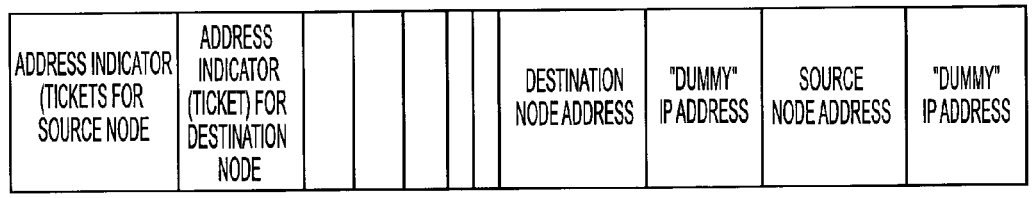

FIG. 5 illustrates the details of the ARP packets according to an exemplary embodiment using created ARP packets.

In an exemplary embodiment, a network device using dynamic updates, such as the network device 102 of FIG. 1, includes a first port and second port. The network device is configured to receive an information packet including a destination address across the first port. The network device includes a translation table, such as translation table 108, for use in translating the destination address into an address indicator which is used to replace the destination address in the information packet and to denote a destination node, such as destination node 109, specified by the destination address. The network device can be configured to transfer the information packet, including the address indicator, across the second port. The network device is adapted to dynamically update the translation table using update information received over at least one of the first and second ports.

The network device can be configured to determine whether the source node and destination node belong to a common group before forwarding the information packet.

The network device can be configured to translate a source address into an additional address indicator that replaces the source address in the information packet.

The update information can be obtained by modifying existing messages between a source and a destination node.

The update information can be obtained by modifying ARP packets transferred between the source and destination node. In one example, the network device is configured to modify an ARP request packet sent from the source node to the destination node. A second network device can be configured to modify an ARP reply packet sent from the destination node to the source node. The ARP reply packet can contain an address of the destination node and an address indicator for the destination node, and the network device can be configured to update the translation table with the correspondence between the address indicator for the destination node and the address of the destination node.

The network device can be configured to examine the existing message between the source node and destination node and if information in the existing message is bogus, the network device modifies the existing message in a manner to indicate the message is improper (e.g., bogus). The update information can be obtained by creating messages to send between the network device and a second network device. In one example, the update information can be obtained by creating ARP packets. The network device can be configured to create an ARP request packet and to send the ARP request to the second network device. The second network device can also be configured to create an ARP reply packet and to send the ARP reply packet to the network device. The network device can be configured to use the ARP reply packet to update the translation table. The created ARP packet can include a dummy value in a target IP address field.

Figure 6:
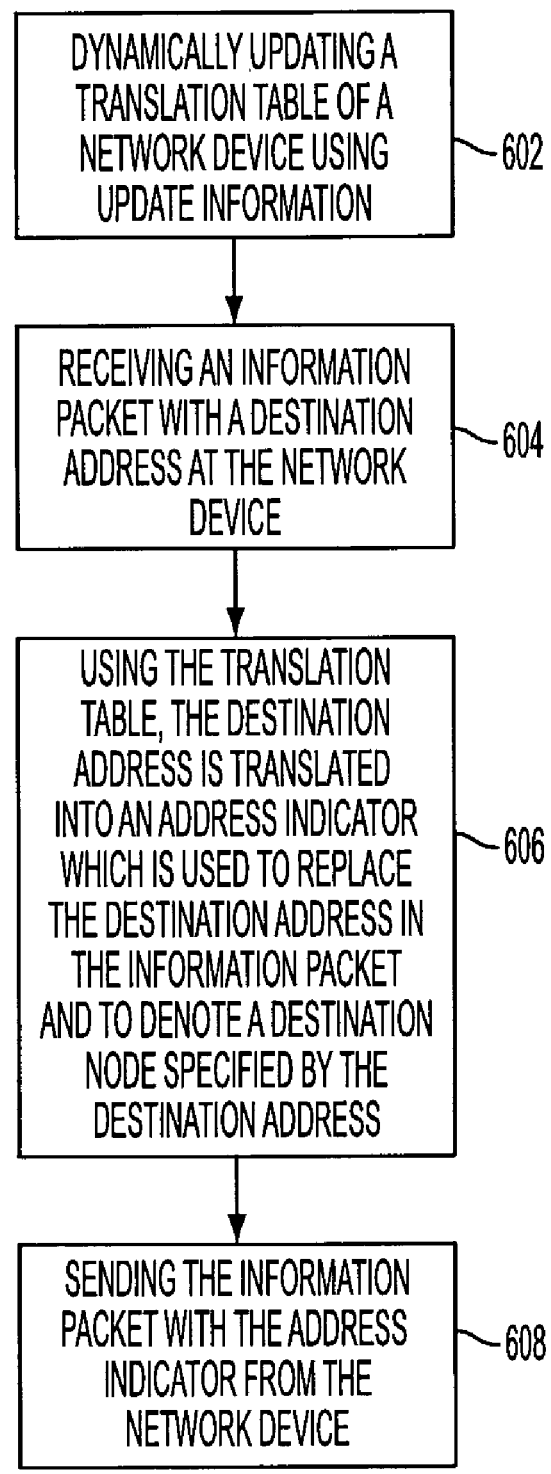
FIG. 6 is a flowchart of an exemplary method of the present invention.

The present invention also relates to a method for controlling communication in a computer network system using dynamic updates. The exemplary method includes dynamically updating a translation table in a network device of the computer network system using updated information, such as in step 602 of FIG. 6; receiving an information packet with a destination address at the network device, such as in step 604 of FIG. 6; using the translation table, translating the destination address into an address indicator which is used to replace the destination address in the information packet and to denote a destination node specified by the destination address, such as in step 606 of FIG. 6; and sending the information packet with the address indicator from the network device, such as in step 608 of FIG. 6.

As discussed with respect to FIGS. 1-5, the method can include determining whether the source node and destination node belong to the same group before forwarding the information packet, and can include translating a source address into an additional address indicator that replaces the source address in the information packet.

Update information can be obtained by modifying existing messages between a source and a destination node. The method can include obtaining the update information by modifying ARP packets transferred between the source and destination node. An ARP request packet sent from the source node to the destination node can be modified as described herein. The method can include modifying an ARP reply packet sent from the destination node to the source node in a second network device. The ARP reply packet can contain an address of the destination node and an address indicator for the destination node, and the method can include updating the translation table with the correspondence between the address indicator for the destination node and the address of the destination node.

The method can include examining an existing message between the source node and destination node and if information in the existing message is bogus, the network device can modify the existing message in a manner to indicate the message is bogus.

The update information can be obtained by creating messages to send between the network device and a second network device. The update information can be obtained by creating ARP packets. In an exemplary embodiment, an ARP request packet is created by the network device and sent to the second network device.

An ARP reply packet can be created by the second network device and sent to the network device. The network device can use the ARP reply packet to update the translation table. The created ARP packet can include a dummy value in a target IP address field.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A computer network system for interconnecting nodes using dynamic updates, comprising:
   a first network device configured to receive an information packet including a destination address from a source node, the first network device including a first translation table for use in translating the destination address into an address indicator which is used in the computer network system to replace the destination address in the information packet and to denote a destination node specified by the destination address; and
   a second network device configured to receive the information packet including the address indicator, the second network device including a second translation table for use in translating the address indicator into the destination address, the second network device being configured to send the information packet including the destination address to the destination node denoted by the address indicator, wherein at least one of the first and second network devices is adapted to dynamically update at least one of the first and second translation tables using update information transferred using the computer network system.

2. The computer network system of claim 1, wherein the first network device is configured to determine whether the source node and destination node belong to the same group before forwarding the information packet.

3. The computer network system of claim 1, wherein the first network device is configured to translate a source address into an additional address indicator, and the second network device is configured to replace the source address in the information packet.

4. A computer network system according to claim 1, wherein the update information is obtained by modifying existing messages between the source and destination node.

5. A computer network system according to claim 4, wherein the update information is obtained by modifying ARP packets transferred between the source and destination node.

6. The computer network system of claim 5, wherein the first network device is configured to modify an ARP request packet sent from the source node to the destination node.

7. The computer network system of claim 5, wherein the second network device is configured to modify an ARP reply packet sent from the destination node to the source node.

8. The computer network system of claim 7, wherein the ARP reply packet contains an address indicator for the destination node inserted by the second network device and an address of the destination node, and wherein the first network device is configured to update the first translation table with the correspondence between the address indicator for the destination node and the address of the destination node.

9. The computer network system of claim 4, wherein the first network device is configured to examine the existing message between the source node and destination node and wherein if information in the existing message is bogus, the first network device is configured to modify the existing message in a manner to indicate the message is bogus.

10. A computer network system according to claim 1, wherein the update information is obtained by creating messages to send between the first and second network device.

11. A computer network system according to claim 10, wherein the update information is obtained by creating ARP packets.

12. The computer network system of claim 11, wherein the first network device is configured to create an ARP request packet and to send the ARP request packet to the second network device.

13. The computer network system of claim 12, wherein the second network device is configured to create an ARP reply packet and to send the ARP reply packet to the first network device.

14. The computer network system of claim 13, wherein the first network device is configured to use the ARP reply packet to update the translation table.

15. The computer network system of claim 11, wherein the created ARP packet includes a dummy value in a target IP address field.

16. A network device using dynamic updates, comprising:
first and second ports, the network device configured to receive an information packet including a destination address across the first port; and
a first translation unit, configured for use with a second translation unit in an additional network device, the first translation unit including a translation table for use in translating the destination address into an address indicator which is used to replace the destination address in the information packet and to denote a destination node specified by the destination address, the network device being configured to transfer the information packet, including the address indicator, across the second port, wherein the network device is adapted to dynamically update the translation table using update information received from the second translation unit over at least one of the first and second ports, wherein the update information is obtained by modifying existing messages between a source and a destination node,
wherein the network device is adapted to communicate with a second network device configured to receive the information packet including the address indicator the second network device including a second translation table for use in translating the address indicator into the destination address, the second network device being configured to send the information packet including the destination address to the destination node denoted by the address indicator,
and wherein at least one of the network device and the second network device is adapted to dynamically update at least one of the first and second translation tables using update information transferred using a computer network system including the network device and the second network device.

17. The network device and method of claim 16, wherein the network device is configured to determine whether a source node and destination node belong to the same group before forwarding the information packet.

18. The network device of claim 16, wherein the network device is configured to translate a source address into an additional address indicator that replaces the source address in the information packet.

19. A network device according to claim 16, wherein the update information is obtained by modifying ARP packets transferred between the source and destination node.

20. The network device of claim 19, wherein an ARP request packet sent from the source node to the destination node is modified in the network device.

21. The network device of claim 16, wherein the network device is configured to examine the existing message between the source node and destination node and wherein if information in the existing message is bogus, the network device is configured to modify the existing message in a manner to indicate the existing message is bogus.

22. A network device according to claim 16, wherein the update information is obtained by creating messages to send between the network device and a second network device.

23. A network device according to claim 22, wherein the update information is obtained by creating ARP packets.

24. The network device of claim 23, wherein the created ARP packet includes a dummy value in a target IP address field.

25. A method for controlling communication in a computer network system using dynamic updates, comprising:
at a first network device of the computer network system,
dynamically updating a first translation table in a first network device of the computer network system using update information received from a second translation table in a second network device of the computer network system;
receiving an information packet with a destination address at the first network device;
using the first translation table, translating the destination address into an address indicator which is used to replace the destination address in the information packet and to denote a destination node specified by the destination address;
sending the information packet with the address indicator from the first network device to the second network device;
at the second network device of the computer network system,
receiving the information packet, including the address indicator, at the second network device;
using the second translation table, translating the address indicator into the destination address;
sending the information packet including the destination address, from the second network device to the destination node indicated by the address indicator.

26. The method of claim 25, comprising:
determining that a source node and destination node belong to a common group before forwarding the information packet.

27. The method of claim 25, comprising:
translating a source address into an additional address indicator that replaces the source address in the information packet.

28. A method according to claim 25, comprising:
modifying ARP packets transferred between the source and destination nodes.

29. The method of claim 28, comprising:
modifying an ARP request packet sent from the source node to the destination node.

30. The method of claim 28, comprising:
modifying an ARP reply packet sent from the destination node to the source node.

31. The method of claim 30, wherein the ARP reply packet contains an address of the destination node and an address indicator for the destination node, further comprising updating the translation table with the correspondence between the address indicator for the destination node and the address of the destination node.

32. The method of claim 25, comprising:
examining the existing message between the source node and destination node and wherein if information in the existing message is bogus, modifying the existing message in a manner to indicate the message is bogus.

* * * * *

UNITED STATES PATENT AND TRADEMARK OFFICE
CERTIFICATE OF CORRECTION

PATENT NO. : 8,145,790 B2
APPLICATION NO. : 10/192631
DATED : March 27, 2012
INVENTOR(S) : David Andrew Thomas It is certified that error appears in the above-identified patent and that said Letters Patent is hereby corrected as shown below:

In the Claims:

In column 8, line 61, in Claim 9, delete "the message" and insert -- the existing message --, therefor.

In column 9, line 11, in Claim 14, delete "the translation" and insert -- the first translation --, therefor.

In column 9, line 36, in Claim 16, delete "indicator" and insert -- indicator, --, therefor.

In column 9, line 50, in Claim 17, after "device" delete "and method".

In column 10, line 35, in Claim 25, delete "packet" and insert -- packet, --, therefor.

In column 10, line 65, in Claim 32, delete "the message" and insert -- the existing message --, therefor.

Signed and Sealed this
Twenty-third Day of July, 2013

Teresa Stanek Rea
*Acting Director of the United States Patent and Trademark Office*